(12) United States Patent
Kellner et al.

(10) Patent No.: US 11,223,080 B2
(45) Date of Patent: Jan. 11, 2022

(54) BATTERY DEVICE FOR AN AT LEAST PARTIALLY ELECTRICALLY OPERATED MOTOR VEHICLE

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 222 days.

(21) Appl. No.: 16/161,439

(22) Filed: Oct. 16, 2018

(65) Prior Publication Data

US 2019/0165437 A1 May 30, 2019

(30) Foreign Application Priority Data

Nov. 24, 2017 (DE) .......................... 102017127807.9

(51) Int. Cl.
*H01M 10/613* (2014.01)
*H01M 10/625* (2014.01)
*H01M 10/6557* (2014.01)
*H01M 10/6567* (2014.01)
*H01M 2/02* (2006.01)
*H01M 2/10* (2006.01)
(Continued)

(52) U.S. Cl.
CPC ......... *H01M 10/6557* (2015.04); *B60L 50/64* (2019.02); *H01M 10/613* (2015.04); *H01M 10/625* (2015.04); *H01M 10/6556* (2015.04); *H01M 10/6567* (2015.04); *H01M 50/20* (2021.01); *H01M 50/24* (2021.01); *H01M 50/258* (2021.01); *H01M 2220/20* (2013.01)

(58) Field of Classification Search
CPC .................................................. H01M 2220/20
See application file for complete search history.

(56) References Cited

U.S. PATENT DOCUMENTS

| 10,062,937 B2 | 8/2018 | Kerspe et al. |
| 2007/0026300 A1 | 2/2007 | Lee et al. |

(Continued)

FOREIGN PATENT DOCUMENTS

| DE | 3333475 C1 | 1/1985 |
| DE | 102008014155 A1 | 9/2009 |

(Continued)

OTHER PUBLICATIONS

German Office Action for German Application No. 10 2017 127 807.9, dated Jul. 6, 2018, with partial translation, 7 pages.

(Continued)

*Primary Examiner* — Haroon S. Sheikh
(74) *Attorney, Agent, or Firm* — RatnerPrestia

(57) ABSTRACT

A battery device for an at least partially electrically operated motor vehicle. The battery device includes at least one battery module with a module housing device, which provides at least one receiving compartment for a plurality of battery cells and surrounds same in the manner of a housing. A duct system conducts a temperature control medium for controlling the temperature of the battery cells. At least two cooling ducts of the duct system are integrated here in a housing portion of the module housing device and are deflected and/or brought together and/or separated there.

14 Claims, 3 Drawing Sheets

(51) Int. Cl.
*B60L 50/64* (2019.01)
*H01M 10/6556* (2014.01)
*H01M 50/20* (2021.01)
*H01M 50/24* (2021.01)
*H01M 50/258* (2021.01)

(56) References Cited

U.S. PATENT DOCUMENTS

| | | |
|---|---|---|
| 2011/0033742 A1 | 2/2011 | Maier et al. |
| 2012/0103714 A1* | 5/2012 | Choi ............ B60L 3/0046 180/68.5 |
| 2013/0280566 A1 | 10/2013 | Chung et al. |
| 2014/0342195 A1* | 11/2014 | Bhola ............ H01M 10/6555 429/50 |
| 2015/0214586 A1 | 7/2015 | Yeow et al. |
| 2016/0190664 A1* | 6/2016 | Frohn ............ H01M 10/6557 429/120 |
| 2017/0047624 A1 | 2/2017 | Gunna et al. |
| 2018/0151927 A1 | 5/2018 | An et al. |

FOREIGN PATENT DOCUMENTS

| | | |
|---|---|---|
| DE | 102017203321 A1 | 9/2018 |
| EP | 2985804 A1 | 2/2016 |
| WO | 2017086664 A1 | 5/2017 |

OTHER PUBLICATIONS

German Search Report for German Application No. 10 2017 129 525.9, dated Oct. 16, 2018, with partial translation- 7 pages.

Mehrali et al., "Effect of Specific Surface Area on Convective Heat Transfer of Graphene Nanoplatelet Aqueous Nanofluids", Experimental Thermal and Flluid Science, 2015, vol. 68, pp. 100-108.

Non Final Office Action for U.S. Appl. No. 16/181,535, dated Dec. 8, 2020, 18 pages.

Final Office Action for U.S. Appl. No. 16/181,535, dated Mar. 17, 2021, 16 pages.

Chinese Office Action for Chinese Application No. 201811365615.9, dated Apr. 22, 2021, with translation, 16 pages.

* cited by examiner

BATTERY DEVICE FOR AN AT LEAST PARTIALLY ELECTRICALLY OPERATED MOTOR VEHICLE

CROSS-REFERENCE TO RELATED APPLICATION

This application claims priority to German Patent Application No. DE 10 2017 127 807.9, filed Nov. 24, 2017, which is incorporated by reference herein in its entirety.

FIELD OF THE INVENTION

The present invention relates to a battery device, in particular high-voltage energy accumulator, for an at least partially electrically operated motor vehicle. The battery device comprises at least one battery module with at least one module housing device, which provides at least one receiving compartment for a plurality of battery cells and surrounds same in the manner of a housing. The module housing device is provided with at least one duct system for conducting at least one temperature control medium for controlling the temperature of the battery cells.

BACKGROUND OF THE INVENTION

Reliable temperature management is generally of great importance for the operation and durability of the battery of an electric vehicle. Such batteries are frequently provided with a temperature control device which, for example, can cool or else heat the battery cells.

The prior art has, for example, disclosed batteries in which the battery cells are combined into groups to form battery modules. The battery modules are arranged along cooling ducts. However, expensive and complicated connection of the cooling ducts to the battery modules is frequently necessary. In addition, the cooling action of such an arrangement is capable of improvement.

Batteries in which the cooling ducts are arranged along the battery cells have therefore been disclosed. For example, DE 10 2008 014 155 A1, which is incorporated by reference herein, shows a battery system with battery cells which are arranged on a heat sink, through which a coolant flows. However, such a heat sink requires sufficient construction space. In addition, a significantly increased outlay on production and costs is frequently necessary.

SUMMARY OF THE INVENTION

Described herein is a battery device for an at least partially electrically driven vehicle which permits an improved and preferably cost-effective temperature control of the battery cells that is optimized in terms of construction space and in terms of weight.

The battery device according to aspects of the invention is designed in particular as a high-voltage energy accumulator. The battery device is in particular suitable and designed for an at least partially electrically operated vehicle. The battery device comprises at least one battery module with at least one module housing device, which provides at least one receiving compartment for a plurality of battery cells and surrounds same in the manner of a housing. The module housing device is provided with at least one duct system for conducting at least one temperature control medium for controlling the temperature of the battery cells. At least two cooling ducts of the duct system at least partially, preferably completely, integrated here in at least one housing portion of the module housing device. The at least two cooling ducts are preferably deflected and/or brought together and/or separated there.

The battery device according to aspects of the invention affords numerous advantages. A considerable advantage is afforded by the cooling ducts being integrated in the housing portion of the module housing device. This makes it possible to accommodate them with particularly little construction space being required. In addition, a particularly advantageous integration of functions arises since, in addition to the enclosure, the module housing device at the same time also carries out a function during the temperature control of the battery cells. Weight and outlay on production are thus considerably reduced. In addition, the arrangement according to aspects of the invention of the cooling ducts provides a considerable improvement in the cooling efficiency.

A further considerable advantage of the battery device according to aspects of the invention is that a particularly compact deflection or bringing together or separating of the cooling ducts is made possible. For example, technical flow components which would further increase the outlay on production and would reduce the construction space can be dispensed with.

The at least two cooling ducts are in particular surrounded by the module housing device. The cooling ducts are preferably surrounded by the module housing device in a media-tight manner. In particular, the module housing device provides at least one wall for the cooling ducts, said wall surrounding the cooling ducts in a duct-like and preferably media-tight manner. The housing portion comprises in particular at least one wall or is provided by at least one such wall.

It is particularly preferred that the at least two cooling ducts run at least in sections within at least one wall of the housing portion of the module housing device. In particular, the cooling ducts run within an outer wall of the module housing device. In particular, the at least two cooling ducts are arranged outside the receiving compartment. It is preferred for the at least two cooling ducts not to run in the receiving compartment. The at least two cooling ducts are in particular delimited in a media-tight manner with respect to the receiving compartment and/or with respect to the surroundings of the battery module.

The housing portion is preferably formed integrally with the cooling ducts. A separate configuration of housing portion and cooling ducts is also possible. The housing portion can be formed as a single part or as multiple parts.

The housing portion preferably has at least one local recess for the deflecting and/or bringing together and/or separating of the at least two cooling ducts. It is also preferred for the housing portion to have at least one shortening of at least one web running between the at least two cooling ducts, for the deflecting and/or bringing together and/or separating of the at least two cooling ducts. Such configurations afford a particularly uncomplicated conducting of the flow which is at the same time optimized in terms of construction space. It is also possible for the housing portion to have at least one other structure suitable for the deflecting and/or bringing together and/or separating.

In particular, at least one web is in each case arranged between the cooling ducts. In particular, the housing portion is formed integrally with the web. A separate configuration of housing portion and web is also possible. The webs run in particular between adjacent cooling ducts.

The local recess and/or the shortening of the web running between the cooling ducts is produced by means of at least one retrospective mechanical machining operation, and preferably by means of a milling process. This provides cost-effective and uncomplicated production. It is also possible for the local recess and/or the shortening to be produced by means of at least one other suitable manufacturing method and in particular another suitable cutting method.

It is preferred for the module housing device to comprise at least one housing center part which can be arranged between at least two housing end parts. Preferably, the housing center part provides the housing portion with the at least two cooling ducts or comprises at least one such housing portion. The housing portion preferably consists of the housing center part. Such a housing center part has numerous advantages and permits in particular a particularly rapid installation. The housing center part is in particular formed as a single part. It is also possible for the housing center part to be formed in multiple parts. The at least two cooling ducts and in particular also the at least one web running in between are preferably integrated in the housing center part. The cooling ducts and the web are preferably formed integrally with the housing center part. A separate configuration is also possible.

The housing module device comprises in particular at least two housing end parts. The housing center part and the housing end parts are preferably designed as separate components. The housing end parts can be connected directly or indirectly to the housing center part.

It is possible and preferred for the housing center part to bound the receiving compartment on at least two sides and preferably on at least four sides. The housing center part particularly preferably surrounds the receiving compartment on the longitudinal sides and in particular in a tubular manner. The housing end parts bound the receiving compartment here in particular at the ends lying in the longitudinal direction or on the end sides of the housing center part. In particular, the housing center part and the at least two housing end parts at least partially and preferably completely seal the receiving compartment. Connections and/or entrances are in particular provided here.

In a particularly preferred refinement, the local recess and/or the shortening of the web running between the cooling ducts is disposed locally at one end or at both ends of the housing center part. Such a housing center part permits a particularly advantageous integration of functions. It is possible for the local recess to be provided at one end and for the shortening of the web to be provided at another end.

The housing center part is preferably at least partially, and in particular completely, composed of at least one profile component, which is extruded and/or is produced in a continuous manufacturing process, or comprises at least one such profile component. This affords cost-effective provision of a particularly stable housing center part which is provided at the same time with a particularly good cooling action. The housing center part can also consist of at least one profile component which is produced by another suitable manufacturing method. The profile component is preferably of tubular design.

The at least two cooling ducts are preferably closed at least at one end of the housing center part by at least one housing component, and preferably by at least one housing end part. It is possible and preferred also for the at least two cooling ducts to be connected at least at one end of the housing center part to at least one temperature control connection. Such a refinement affords, for example, the advantage that, together with the closing of the receiving compartment, closing or connection of the cooling ducts also takes place. This results in particularly economical and rapid installation.

In particular, the at least two cooling ducts are closed at one end of the housing center part by a housing end part and at another end of the housing center part by another housing end part, and/or are connected to the temperature control connection. It is possible for the housing end part to provide the temperature control connection. It is also possible for the at least two cooling ducts to be closed at at least one end of the housing center part by at least one other, separate housing component and, for example, by an additional component, and/or to be connected to the temperature control connection.

The temperature control connection comprises in particular at least one inlet duct and/or at least one return duct for the temperature control medium into the battery module or from the battery module. The temperature control connection serves in particular for connecting the duct system of the module in terms of flow to supply lines and/or to collectors for further battery modules.

In particular, the module housing device comprises at least one housing end part. The housing end part is in particular the previously described housing end part. The housing end part comprises in particular at least one temperature control connection for at least one of the at least two cooling ducts in the housing center part. The temperature control connection is designed here in particular as described previously. It is possible and preferred also for the housing end part to comprise at least one further cooling duct with at least one deflection and/or with at least one intersection to the housing center part. Such a housing end part provides an uncomplicated connection of the cooling ducts and at the same time provides a particularly reliable housing structure.

The further cooling duct is suitable and designed in particular as an inlet and/or return of the temperature control medium into the housing center part or from the housing center part. The further cooling duct is in particular connected in terms of flow to the at least two cooling ducts in the housing center part. In particular, at least one further cooling duct is provided in each case as an inlet and return. The further cooling duct is in particular integrated in the housing end part. It is possible for the further cooling duct to run at least in sections within a wall of the housing end part.

It is preferred that, in order to seal the housing center part with respect to the housing end parts and/or in order to close the cooling ducts, the housing center part is screwed and/or welded and/or adhesively bonded to and/or pressed against at least one of the at least two housing end parts. It is possible and preferred also for at least one plastic and/or elastic sealing device to be arranged between the housing center part and at least one of the at least two housing end parts. Other suitable sealing devices are also possible. The sealing device can be, for example, screwed and/or welded and/or adhesively bonded and/or pressed. This provides reliable and at the same time uncomplicated sealing or closing.

In all of the refinements, it is particularly preferred that the at least two cooling ducts run at least in sections in one or in both side walls of the housing center part. It is likewise preferred that the at least two cooling ducts run at least in sections in an upper and/or lower wall of the housing center part. Particularly effective control of the temperature of the battery cells can thus be achieved. For example, two or more cooling ducts run in one side wall in each case. Alternatively or additionally, two or more cooling ducts run in each case in the upper and lower wall of the housing center part.

The housing center part is preferably at least partially, and in particular completely, manufactured from at least one light metal material. The light metal material is preferably composed of aluminum and/or of magnesium and/or of the respective alloys thereof. This permits a particularly advantageous reduction in weight and an advantageous cooling action.

It is possible and preferred also for the housing center part to be at least partially, and in particular completely, produced from at least one fiber-plastic composite, in particular by means of braiding and/or pultrusion. It is also possible for the housing center part to be at least partially, and in particular completely, produced from at least one unreinforced or fiber-reinforced plastic, in particular by means of extrusion. Such refinements also afford considerable advantages in respect of the weight and the housing function and also the cooling action.

In all of the refinements, it is preferred for water and/or a water-glycol mixture and/or an evaporable refrigerant and/or oil to be provided as the temperature control medium. Another suitable temperature control medium is also possible. The temperature control medium is in particular a fluid.

The motor vehicle according to aspects of the invention is provided with an at least partially electrically operated traction drive. The motor vehicle comprises at least one battery device, as has previously been described, for the energy supply of the traction drive.

The motor vehicle according to aspects of the invention has numerous advantages and can be produced, for example, in a particularly economical and uncomplicated manner. In addition, it provides an optimized overall weight. The motor vehicle is designed in particular as a passenger motor vehicle.

Within the scope of the present invention, a module housing device is preferably understood not as meaning a housing for the entire battery or for the entirety of all the battery cells, but rather a housing for a group of battery cells which are combined to form a battery module.

The battery cells of the battery device are combined in particular into groups to form battery modules. The battery modules in particular are connected electrically to one another and are preferably also connected in terms of flow with respect to the temperature control medium. The battery device preferably comprises a plurality of battery modules. The battery device can also comprise just one battery module.

The battery device comprises in particular at least one receiving device for the at least one battery module and preferably for a plurality of battery modules. The receiving device is designed, for example, as a housing or the like. The battery modules can be accommodated in particular together with their module housing devices in the receiving device.

In a particularly preferred refinement, at least three cooling ducts and preferably a multiplicity of cooling ducts are integrated in the housing portion of the module housing device. In particular, adjacent cooling ducts are deflected and/or brought together and/or separated. The cooling ducts preferably run substantially parallel to one another at least in sections. This permits particularly simple production of the cooling ducts, for example in a continuous manufacturing process. The at least two cooling ducts can also be brought together and/or deflected in such a manner that, for example, a circular and/or spiral profile arises.

The module housing device is designed in particular as an outer housing. In particular, the module housing device encloses the receiving compartment and the battery cells accommodated therein and in particular also further components which are accommodated therein. In particular, the module housing device at least partially, and in particular completely, delimits the receiving compartment to the outside. Connections and/or entrances can be provided here.

Within the scope of the present invention, the term cooling is preferably used within the context of temperature control, and therefore it is also understood as meaning warming up or heating.

The duct system is in particular part of at least one temperature control device. The temperature control device can comprise at least one conveying device for conveying the temperature control medium, and/or at least one heat exchanger and/or other components provided for the temperature control.

BRIEF DESCRIPTION OF THE DRAWING FIGURES

Further advantages and features of the present invention will emerge from the exemplary embodiment, which will be discussed below with reference to the appended figures.

DETAILED DESCRIPTION OF THE INVENTION

Figure 1:
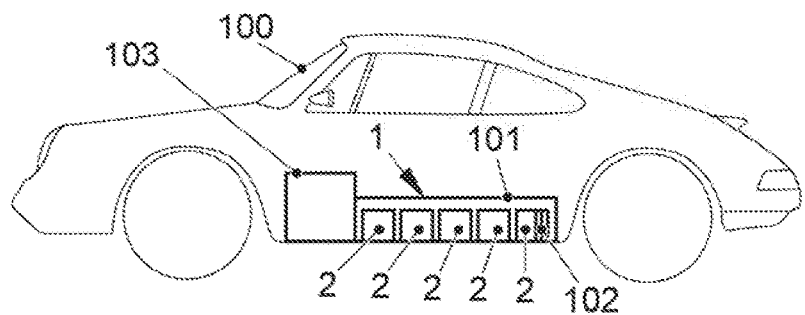
FIG. 1 is a highly schematic illustration of a battery device according to aspects of the invention in a motor vehicle.

FIG. 1 shows a motor vehicle 100 or passenger vehicle which is designed as an electric vehicle. The vehicle 100 can also be designed as a hybrid vehicle. The motor vehicle 100 is equipped with a battery device 1 according to aspects of the invention which serves as a high-voltage accumulator 101 for an electric traction drive 103. The battery device 1 is accommodated here by way of example in a floor region of the motor vehicle 100. The battery device 1 may, however, also be arranged at another location in the motor vehicle 100.

The battery device 1 comprises a plurality of battery modules 2 which each have a plurality of, or a functional group of, battery cells 102. More or fewer battery modules 2 than shown here may also be provided. For better clarity, only one battery cell 2 is shown here by way of example.

Figure 2:
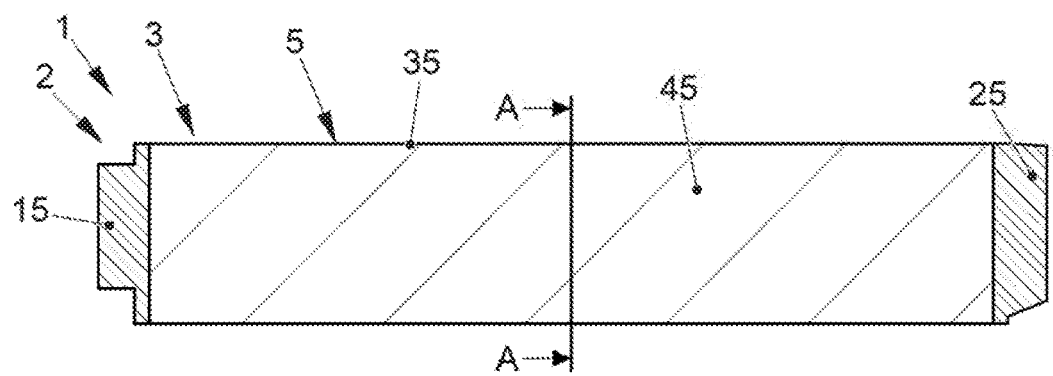
FIG. 2 is a schematic illustration of a battery module of a battery device in a side view.
Figure 3:
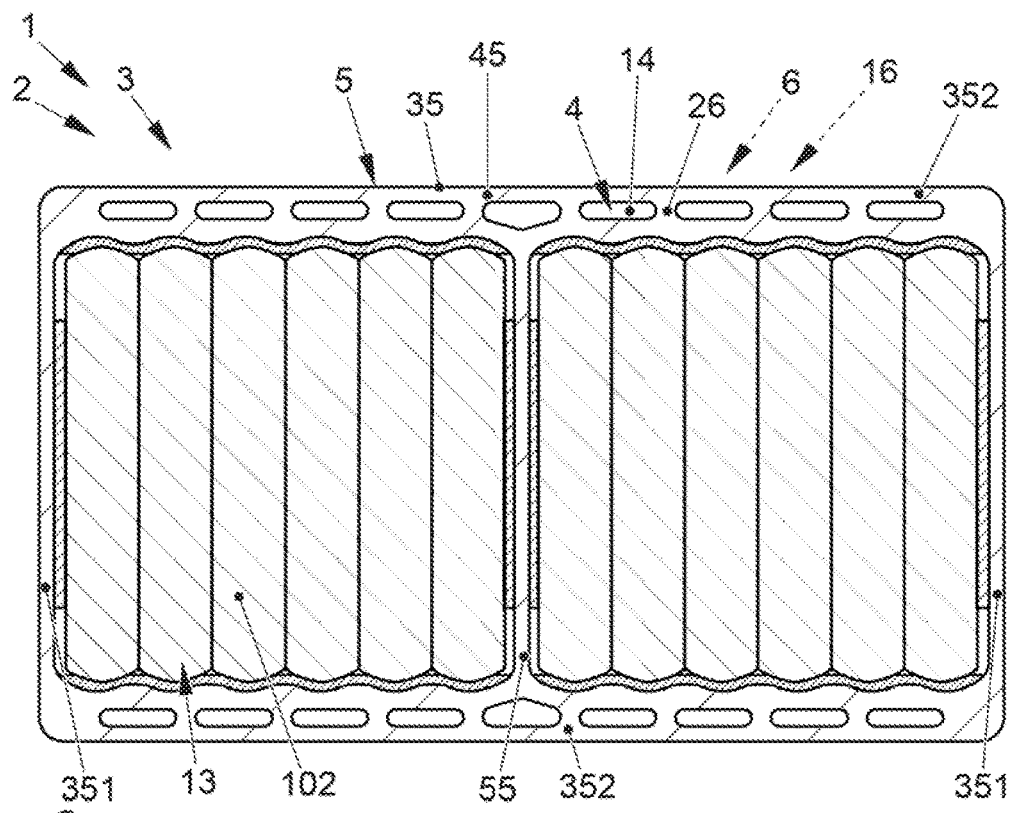
FIG. 3 is a schematic illustration of the battery module in a front view sectioned along the line A-A of FIG. 2.

FIGS. 2 and 3 show a battery device 1 according to aspects of the invention in a side view and in a sectioned illustration, respectively. The battery cells 102 associated with the battery module 2 are enclosed here in a module housing device 3. The module housing device 3 provides a receiving compartment 13 for the cells 102. The receiving compartment 13 is divided here by a reinforcement 55.

The module housing device 3 comprises a housing center part 35 which is closed at the ends by a respective housing end part 15, 25. The housing center part 35 here is a profile component 45 which, for example, is an extruded profile and/or is produced in a continuous manufacturing process.

The housing center part 35 surrounds the receiving compartment 13 or the battery cells 102 on the longitudinal sides and in a tubular manner. For this purpose, the housing center part 35 has two opposite side walls 351 and an upper wall 352 and a lower wall 352.

The battery device 1 is equipped here with a temperature control device for controlling the temperature of the battery cells 102. For this purpose, a duct system 4 is provided through which a temperature control medium is conducted. The duct system 4 here comprises a plurality of cooling ducts 14 through which the temperature control medium can flow. The cooling ducts 14 are thereby separated from one another by webs 26.

The cooling ducts 14 run within a housing portion 5 and are integrated therein. The housing portion 5 is formed here by the housing center part 35. In the configuration shown here, the cooling ducts 14 are located both in the upper and in the lower wall 352. The cooling ducts 14 can also be arranged only in the upper or the lower wall 352. However, a housing center part 35 can also be provided which, alternatively or additionally, is equipped with cooling ducts 14 in one or in both side walls 351. The cooling ducts 14 are completely surrounded here in the longitudinal direction by the corresponding wall 351, 352.

The cooling ducts 14 are brought together and deflected here within the housing center part 35 and separated by the webs 26.

One or more shortenings 16 of certain webs 26 are provided here in order to bring together or to deflect the cooling ducts 14. The webs 26 can also be provided with a local recess 6 through which the temperature control medium can, for example, leave a cooling duct 14 or can be introduced into another cooling duct 14.

In the sectional plane shown here, however, the shortenings 16 and recesses 6 are not visible. For example, the shortenings 16 and recesses 6 are arranged at one or both end regions of the housing center part 35.

Figure 4:
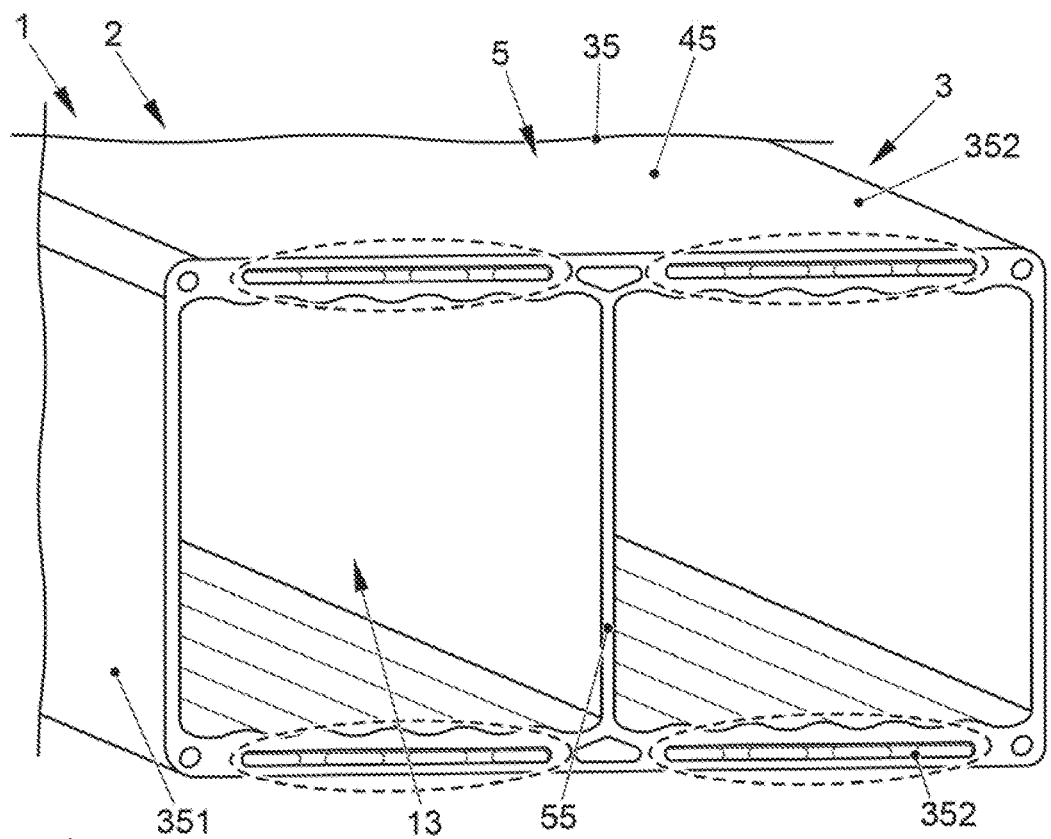
FIG. 4 is a schematic illustration of a module housing device of a battery device in a sectioned side view.

FIG. 4 illustrates the housing center part 35 of the FIG. 3 in more detail. In the illustration shown here, the shortenings 16 of the webs 26 can be particularly readily seen. The shortenings 16 are arranged here at an end region or on an end side of the housing center part 35.

The shortenings 16 of the webs 26 were produced here by a retrospective mechanical machining operation of the profile component 45 and, for example, by a milling process. The recesses 6 can also be produced in a corresponding manner.

Figure 5:
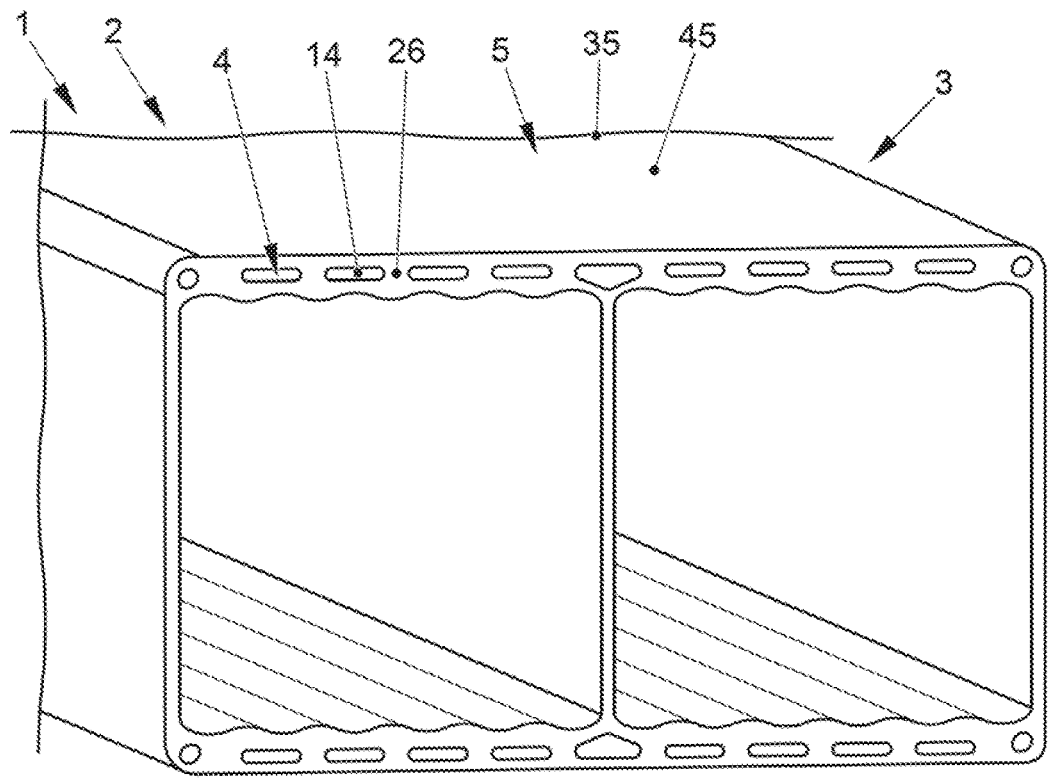
FIG. 5 is a schematic illustration of the module housing device prior to a machining operation, in a sectioned perspective view.

FIG. 5 shows the housing center part 35 before the production of the shortenings 16. The webs 26 therefore extend as far as the end or the end side of the housing center part 35.

Figure 6:
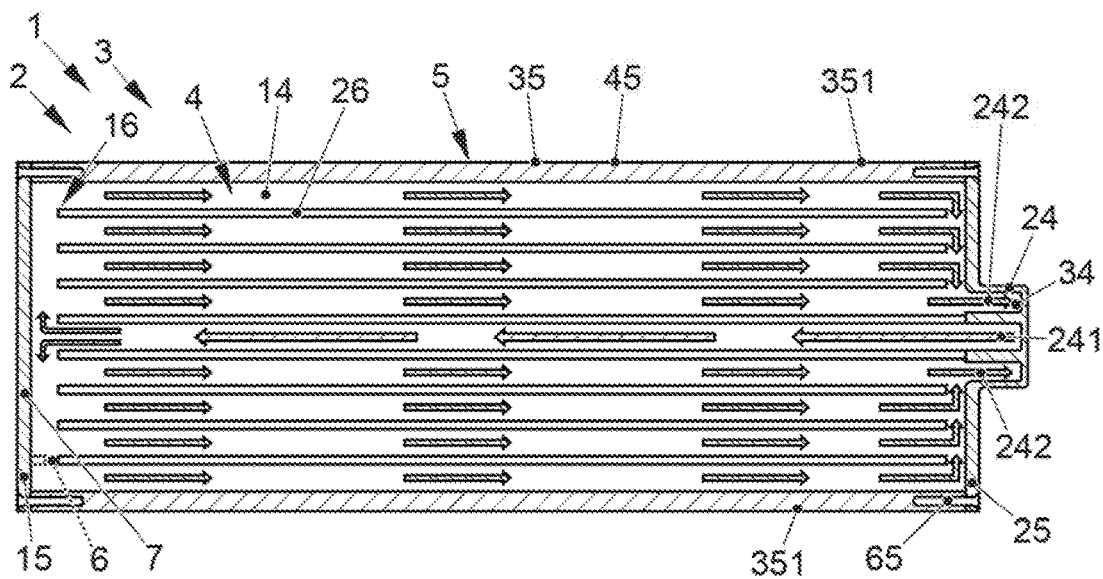
FIG. 6 is a schematic illustration of a module housing device in a sectioned top view.

FIG. 6 shows the module housing device 3 in a sectioned top view. The sectional plane runs here through the upper wall 352, and therefore the profile of the cooling ducts 14 and of the webs 26 can be particularly readily seen. The flow directions are indicated here by corresponding arrows.

In addition, the shortenings 16 at the ends or in the region of the end side of the housing center part 35 can be particularly readily seen in the illustration shown here. In addition, a local recess 6 is illustrated highly schematically here.

The housing center part 35 is closed at both ends or on the end sides by a respective housing end part 15, 25. As a result, the cooling ducts 14 are also closed at their ends.

The one housing end part 25 is provided here with a temperature control connection 24. The temperature control connection 24 is provided with an inlet 241 and two outlets 242 for the temperature control medium. For this purpose, further cooling ducts 34 which are connected in terms of flow to the cooling ducts 14 are incorporated in the housing end part 25. The housing end part 25 here therefore constitutes an intersection to the housing center part 35, via which the battery module 2 can be coupled, for example, to other battery modules 2 or to external supply lines.

The other housing end part 15 here closes the other end or the other end side of the housing center part 35.

The cooling duct 14 which is adjacent to the inlet 241 is provided here with continuous webs 26. An undesirable mixing of the inflowing temperature control medium can thus be avoided.

The housing end parts 15, 25 are screwed here to the housing center part 35 in a media-tight manner. Alternatively or additionally, welding and/or adhesive bonding and/or pressing or the like can be provided.

In addition, a sealing device 7 is in each case arranged here between the housing center part 35 and the housing end parts 15, 25. For example, a plastic or elastic seal is provided.

Figure 7:
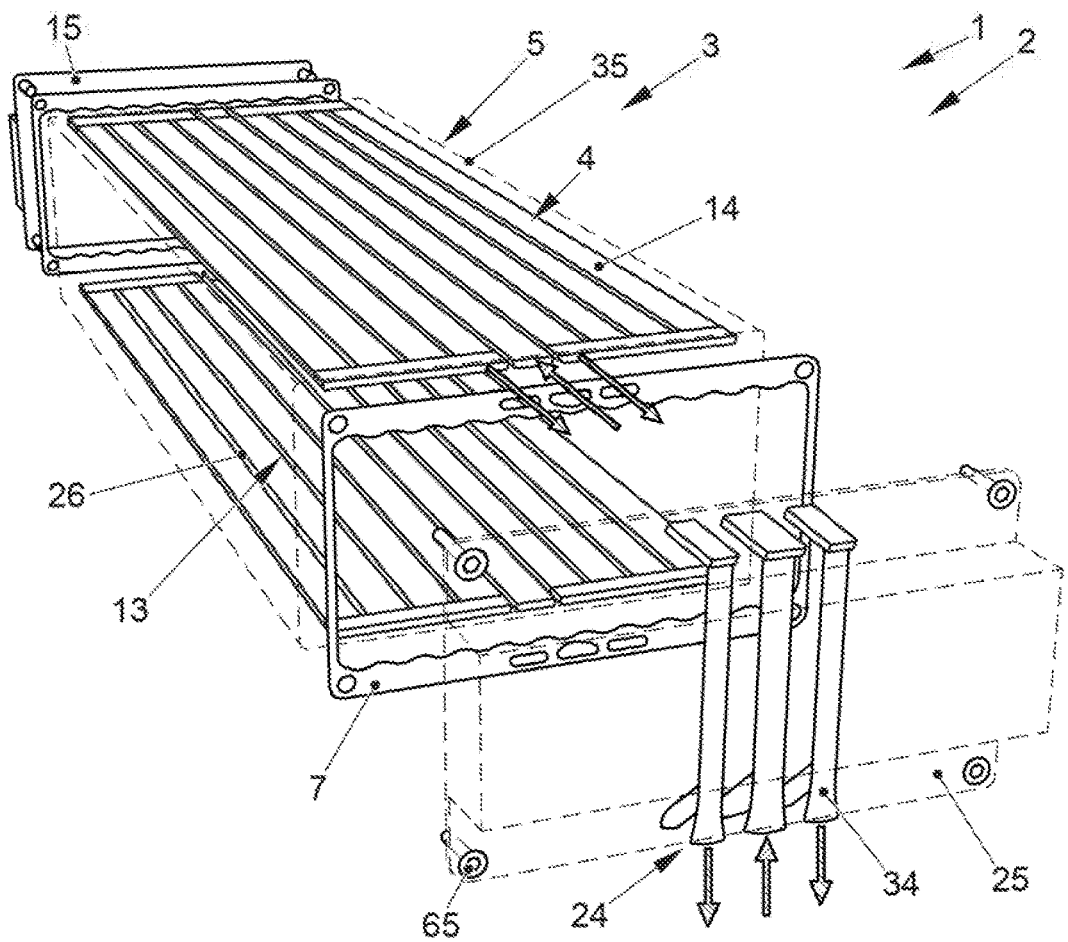
FIG. 7 is a schematic illustration of a module housing device in a partially transparent perspective exploded illustration.

FIG. 7 shows a partially transparently illustrated module housing device 3 which is designed, for example, as previously described. The cooling ducts 14 run here within the upper and the lower wall of the housing center part 35. The flow directions are indicated here by corresponding arrows.

The housing end parts 15, 25 are equipped here with further cooling ducts 34 which connect the cooling ducts 14 arranged at the top to the cooling ducts 14 arranged at the bottom. For this purpose, the housing end parts 15, 25 are equipped with cooling ducts 34 running transversely with respect to the upper and lower cooling ducts 14. An encircling flow of the temperature control medium is thus made possible.

The front housing end part 25 in the illustration shown here is provided with a temperature control connection 24. The battery module 2 can be coupled via the latter to further battery modules or to external lines for the temperature control medium.

Also presented herein is a module housing device 3, in which the temperature control medium and the cooling ducts 14 are integrated directly in the housing. The cooling efficiency can thus be significantly improved. For example, particularly low thermal resistance between temperature control medium and battery cells 102 thereby arises.

Cost savings because of the integration of functions or reduction in the number of parts are a further advantage. Separate cooling lines which would have to be thermally connected to the battery module, for example by means of expensive heat-conducting pastes, can thereby be omitted.

Overall, the invention provides a considerable improvement in the cooling efficiency. In addition, a considerable weight reduction and a significant cost reduction and also a considerably lower requirement for construction space are achieved.

LIST OF REFERENCE DESIGNATIONS

1 Battery device
2 Battery module

3 Module housing device
4 Duct system
5 Housing portion
6 Recess
7 Sealing device
13 Receiving compartment
14 Cooling duct
15 Housing end part
16 Shortening
24 Temperature control connection
25 Housing end part
26 Web
34 Cooling duct
35 Housing center part
45 Profile component
55 Reinforcement
65 Screw connection
100 Motor vehicle
101 High-voltage energy accumulator
102 Battery cell
103 Traction drive
241 Inlet
242 Return
351 Side wall
352 Wall

What is claimed is:

1. A battery device for an at least partially electrically operated motor vehicle, the battery device comprising:
   at least one battery module having at least one module housing device,
   the module housing device defining at least one receiving compartment for receiving a plurality of battery cells, the module housing device including at least one duct system for conducting at least one temperature control medium for controlling a temperature of the battery cells, and
   two interconnected cooling ducts of the duct system are at least partially integrated in at least one housing portion of the module housing device,
   wherein the module housing device comprises at least one housing center part arranged between at least two housing end parts, and wherein the two interconnected cooling ducts are disposed on the housing center part, wherein one of the two interconnected cooling ducts is positioned on a bottom side of the housing center part at a location beneath the receiving compartment, and the other of the two interconnected cooling ducts is positioned on a top side of the housing center part at a location above the receiving compartment, wherein one of the two housing end parts includes three end part ducts, each having a fluid inlet, a fluid outlet and a fluid channel extending between the two interconnected cooling ducts for fluidly connecting the two interconnected cooling ducts, wherein the three end part ducts are disposed in said one of the two housing end parts, and wherein the three end part ducts constitute a supply duct and two return ducts.

2. The battery device as claimed in claim 1, wherein the housing portion has at least one local recess or at least one shortened web running adjacent one of two cooling ducts comprised by the interconnected cooling ducts for interconnecting the two cooling ducts with one another, and wherein the local recess or the shortened web is arranged locally at one end of the housing center part.

3. The battery device as claimed in claim 2, wherein the at least one local recess or the at least one shortened web is defined in a single wall of the module housing device.

4. The battery device as claimed in claim 1, wherein the housing center part is at least partially composed of at least one profile component, which is extruded or is produced in a continuous manufacturing process.

5. The battery device as claimed in claim 1, wherein, in order to seal the housing center part with respect to at least one housing end part or in order to close the interconnected cooling ducts, either (i) the housing center part is screwed or welded or adhesively bonded to or pressed against at least one of the at least two housing end parts, or (ii) wherein at least one plastic or elastic sealing device is arranged between the housing center part and at least one of the at least two housing end parts.

6. The battery device as claimed in claim 1, wherein the two interconnected cooling ducts run at least in sections in an upper or lower wall of the housing center part.

7. The battery device as claimed in claim 1, wherein the housing center part is at least partially manufactured from at least one light metal material, and wherein the light metal material is composed of aluminum, aluminum alloy, magnesium or magnesium alloy.

8. The battery device as claimed in claim 1, wherein the housing center part is at least partially produced from at least one fiber-plastic composite by braiding or pultrusion, or wherein the housing center part is at least partially produced from at least one unreinforced or fiber-reinforced plastic by extrusion.

9. The battery device as claimed in claim 1, wherein the temperature control medium is water or a water-glycol mixture or an evaporable refrigerant or oil.

10. The battery device as claimed in claim 1, wherein the battery device is a high-voltage energy accumulator.

11. The battery device as claimed in claim 1 further comprising a reinforcing wall disposed in the module housing device for dividing the at least one receiving compartment into two receiving compartments, wherein the reinforcing wall extends in a same direction as the cooling ducts.

12. The battery device as claimed in claim 11, wherein the reinforcing wall is aligned with an inlet of the duct system.

13. The battery device as claimed in claim 1, wherein the supply duct is positioned between and fluidly interconnected to the two return ducts by the interconnected cooling duct in the top side of the housing center part.

14. A motor vehicle with an at least partially electrically operated traction drive, comprising the battery device as claimed in claim 1, for the energy supply of the traction drive.

* * * * *